United States Patent
Cameron et al.

(10) Patent No.: US 6,344,152 B2
(45) Date of Patent: *Feb. 5, 2002

(54) DERIVATIVES OF CYCLOALIPHATIC DIAMINES AS COSOLVENTS FOR AQUEOUS HYDROPHOBIC AMINES

(75) Inventors: Randy Edwin Cameron, Calabasas; Frank Rawolle, San Diego, both of CA (US)

(73) Assignee: PRC-DeSoto International, Inc., Glendale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/330,574

(22) Filed: Jun. 11, 1999

(51) Int. Cl.[7] ............... C09K 3/00; C08K 5/16; B01F 1/00; B01F 3/08
(52) U.S. Cl. ............... 252/182.13; 252/182.12; 252/364; 516/67; 523/403; 523/404; 530/350
(58) Field of Search ............... 516/67; 252/364, 252/182.13, 183.12; 523/403, 404; 530/350

(56) References Cited

U.S. PATENT DOCUMENTS

| | | | |
|---|---|---|---|
| 4,290,815 A | 9/1981 | Henry | 106/200.3 |
| 4,308,183 A | 12/1981 | Williams | 523/402 |
| 4,341,578 A | 7/1982 | Georgalas et al. | 523/414 |
| 4,342,843 A | * 8/1982 | Perlinski et al. | 523/409 |
| 4,422,944 A | 12/1983 | Selvarajan et al. | 210/736 |
| 4,539,347 A | 9/1985 | DeGooyer | 523/404 |
| 4,683,262 A | 7/1987 | Whyzmuzis et al. | 524/608 |
| 4,748,167 A | 5/1988 | Das et al. | 524/410 |
| 5,037,700 A | 8/1991 | Davis | 428/414 |
| 5,171,797 A | 12/1992 | Crowley et al. | 525/489 |
| 5,208,319 A | 5/1993 | Schilling | 530/210 |
| 5,250,109 A | 10/1993 | Chan et al. | 106/31.43 |
| 5,310,770 A | 5/1994 | DeGooyer et al. | 523/414 |
| 5,344,856 A | 9/1994 | Klein | 523/403 |
| 5,354,789 A | 10/1994 | Kamikado | 523/420 |
| 5,416,166 A | 5/1995 | Yoo et al. | 525/286 |
| 5,567,748 A | 10/1996 | Klein et al. | 523/420 |
| 5,589,534 A | 12/1996 | Metzger et al. | 524/548 |
| 5,596,030 A | 1/1997 | Walker | 523/404 |
| 5,599,855 A | 2/1997 | Walker | 523/404 |
| 5,602,193 A | * 2/1997 | Stark | 523/403 |
| 5,648,409 A | * 7/1997 | Arora et al. | 523/404 |
| 5,719,210 A | 2/1998 | Arora et al. | 523/404 |
| 5,856,014 A | * 1/1999 | Imashiro et al. | 428/425.3 |
| 5,859,135 A | 1/1999 | Doomen et al. | 525/123 |

* cited by examiner

*Primary Examiner*—Daniel S. Metzmaier
(74) *Attorney, Agent, or Firm*—Finnegan, Henderson, Farabow, Garrett & Dunner

(57) ABSTRACT

The present invention relates to the use of cycloaliphatic diamines as cosolvents for hydrophobic amines in aqueous solution. The cycloaliphatic diamines of the present invention have a formula:

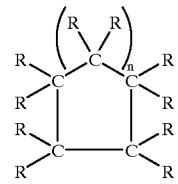

where n is 1 or 2, each R is independently selected from a group consisting of: hydrogen, a 1 to 6 carbon aliphatic, and a 0 to 6 carbon containing amine, wherein each R is chosen such that the cosolvent amine comprises at least two amine groups; and a quantity of water to maintain said solution as a homogeneous phase. The cosolvent diamines have particular utility in the formation of water based epoxy resin curing agents. Superior water miscibility is achieved for hydrophobic amines through the use of cycloaliphatic amines as compared to conventional cosolvents.

3 Claims, No Drawings

DERIVATIVES OF CYCLOALIPHATIC DIAMINES AS COSOLVENTS FOR AQUEOUS HYDROPHOBIC AMINES

FIELD OF THE INVENTION

This invention relates to solubilizing aqueous solutions of hydrophobic amines with cycloaliphatic amine cosolvent, and more particularly to aqueous solutions of hydrophobic amines operative as epoxy resin curing agents which yield highly cross linked, water resistant and abrasion resistant adhesive films.

BACKGROUND OF THE INVENTION

Epoxy resin curing agent systems were traditionally mixed in an organic. solvent base. Organic solvents have numerous problems including flammability, cost and the polluting effects of volatile organic component (VOC) release. Solvent recovery or vapor condensation after coating cure represent inefficient processes for coping with VOC release upon curing. Therefore, in order to comply with ever more stringent environmental regulations, there is a growing trend towards aqueous based epoxy resin curing agents. As a result, there has been considerable effort to develop water based epoxy resins and epoxy resin curing agents that upon mixing provide films having the same flexible, tough films obtained from solvent based mixtures.

The utilization of a surfactant to disperse hydrophobic epoxy resin curing agents in water have met with limited success. The films resulting from surfactant dispersions or emulsions generally exhibited poor chemical and water resistance, owing to the high concentration of surfactant contained within the films. Epoxy resin curing agents most often employed are amines such as polyamines or polyamides. Another approach to obtain aqueous solutions utilized hydrophilic amines as epoxy resin curing agents. Such amines have an affinity for water thus obviating the need for surfactants; however, the resulting cured epoxy films demonstrate poor water resistance as compared to solvent based films.

Superior epoxy resin curing agents, such as hydrophobic amines which form highly water resistant films, are not water soluble and require large quantities of cosolvent, surfactant or acid in order to create an aqueous dispersion or emulsion. This problem is exacerbated when the epoxy resin curing agent is a high equivalent weight amine which tends to impart desirable flexibility on a resulting cured film. Prior art attempts to form aqueous solutions of hydrophobic amines have utilized cosolvents including ethylene glycol ethers; polyoxyalkylene amines, U.S. Pat. No. 5,250,109; butyl cellosolve, U.S. Pat. No. 4,308,183; and the like which are described in U.S. Pat. No. 4,246,148; Bronsted and Lewis acids such as acetic acid and nitroparaffins. Unfortunately, cosolvents or acids tend to increase the concentration of VOCs. Entrapment of cosolvents or acids furthermore tends to detract from film barrier properties and increase the water sensitivity of the resulting cured film. Commercially available hydrophilic amines serve as reactive cosolvents for the dissolution of hydrophobic amines in water. Dytek A (DuPont) and EDR 148 (Texaco) are examples of common hydrophilic amines. Unfortunately, such hydrophilic amines support only limited addition of water to a hydrophilic/hydrophobic amine blend prior to phase separation of the hydrophobic amine from the aqueous portion.

DESCRIPTION OF THE INVENTION

The present invention is directed towards aqueous solvents of hydrophobic amines. While the description herein largely focuses on aqueous solutions of hydrophobic amines as epoxy curing agent systems, it is appreciated that solubilizing hydrophobic amines in water has broad applicability. For example, transmembrane proteins, dye compounds and pharmaceuticals containing amine functionalities benefit from aqueous solubilization according to the present invention.

The term "hydrophilic" as used herein defines a compound capable of forming the aqueous solution of a compound of a molarity greater than 0.01 molar or in the case of a polymeric substance, forming a solution at greater than about 5 parts by weight per hundred parts water. Consequently, the term "hydrophobic" defines a compound or polymeric substance incapable of forming aqueous solutions of the aforementioned hydrophilic concentrations at room temperature.

The identity of the hydrophobic amine is dictated by parameters independent of the present invention. For example, in the case of epoxy resin curing agents, the hydrophobic amine illustratively includes diethylene triamine; di(aminoethyl)ether, polyfunctional amines; polyoxyalkylene polyamines such as polyoxyethylene-propylene polyamine; hydroxyethylamino ethylamine; ethylamino ethylamine; aldamine and the like. The amine may also include a high equivalent weight mono or polyamide having a similar aliphatic moiety as compared to the polyamines, a polypeptide, or pharmaceutically active amine-containing hydrophobic compound.

The cosolvent diamines of the present invention aid in solubilizing the hydrophobic amine. The cosolvents of the present invention, alone or in combination, are characterized by being water miscible and are satisfactory solvents for the hydrophobic amines. The cosolvent diamines of the present invention are characterized by having the formula:

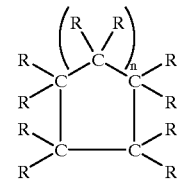

where n is 1 or 2 and the resulting cycloaliphatic is a substituted cyclopentane or cyclohexane; where each R is independently hydrogen, a 1 to 6 carbon aliphatic, or a 0 to 6 carbon containing amine; where the various Rs are chosen such that the cosolvent amine contains two or more amine groups. More preferably, the non-amine R groups independently each contain less than 3 carbon atoms. Still more preferably, the amines are primary amines.

It is appreciated that the reactivity of a cosolvent amine as an epoxy resin curing agent and/or the solvation efficacy towards a hydrophobic amine is effected by steric effects associated with non-hydrogen R groups. Ortho, non-hydrogen R groups exhibit the most significant steric hindrance as compared to other isomers, yet these other isomers are also operative herein.

In order to provide a biologically compatible carrier for pharmaceutical amines, it is appreciated that R is chosen to impart additional moieties to a cosolvent diamine allowing for metabolic clearance and diminished toxicity. Such biologically clearable moieties illustratively include hydroxyl, ketone, aldehydes, carboxylates, carbohydrates and the like.

A cosolvent diamine of the present invention is mixed with a hydrophobic amine of interest to form an amine blend. Thereafter, water is added to the amine blend in any quantity prior to the formation of a turbid solution. Alternatively, the sequence of mixing the hydrophobic amine, cosolvent amine and water is altered to likewise obtain a clear solution. The term "homogenous phase" as used herein refers to a liquid solution which is clear as measured by visual inspection.

The ratio of cosolvent amine to hydrophobic amine is selectively variable, dependent on characteristics including equivalent weight of the hydrophobic amine, miscibility limits of the cosolvent amine with water at solution temperature, and desired hydrophobic amine concentration in aqueous cosolvent solution. Preferably, the amine group ratio between the hydrophobic amine and cosolvent amine is from about 0.5–5:1.

In the instance where the hydrophobic amine is an epoxy resin curing agent, the aqueous solution of the amine and cosolvent amine is utilized to prepare a dispersion of the epoxy resin. In general, it is conventional to employ the epoxy resin in an amount sufficient to achieve an epoxy to amine hydrogen equivalent weight ratio of from about 0.5 to 1.5:1 and preferably from about 0.9 to 1.1:1.

The invention is additionally illustrated in connection with the following examples which are to be considered as illustrative of the present invention. It should be understood that the invention is not limited to the specific details of the examples, but rather to the appended claims.

EXAMPLE 1

10 parts of a polyamidoamine (Air Products 506 amidoamine) is added to a reactor equipped with a mechanical agitator. 10 parts of 1,3 bis-aminomethylcyclohexane is added with stirring. 150 parts of room temperature water is added and the stirring continued until uniform, clear solution is formed. The solution is stable for greater than three months.

EXAMPLE 2

To illustrate the efficiency of the present invention to solubilize various hydrophobic amines, one part by weight of various commercially available hydrophobic amines is blended with one part by weight of a cosolvent amine. Water is then added dropwise with vigorous stirring to the blend of one part hydrophobic amine and one part cosolvent amine. The parts of water added is monitored by the appearance of turbidity as measured by visible light scattering.

The parts of water added to an amine blend that remains a clear solution is summarized for various cosolvents in Table 1. Cosolvents amines A–D are those of the present invention. In order to assess the relative efficiency of the cosolvent amines of the present invention, A–D; conventional cosolvent amines, E–I and the omission of a cosolvent, J are also evaluated. The results are summarized in Table 1.

TABLE 1

Parts of water added to 2 parts of amine blend yielding a clear solution

| | Cosolvent | Air Products 2460 Polyamide | Air Products 506 Amidoamine | Cardolite NC-540 Phenalkamine |
|---|---|---|---|---|
| A. | Isophorone diamine | >22 | >28 | >30 |
| B. | 1,3-Bis (aminomethyl) cyclohexane | >10 | >19 | >18 |
| C. | 1,2-Diamino cyclohexane | 6 | <6 | <3.5 |
| D. | 1,2 Diaminocyclo- pentane | <5 | <5 | <3.5 |
| E. | Dytek A (DuPont) | 3.5 | <6 | <3.9 |
| F. | 1,4-Bis(3- aminopropyl) piperazine | <2 | <4 | <.5 |
| G. | EDR 148 Texaco | <2 | <2 | <.5 |
| H. | 1,2-Hexanediamine | <3.6 | <7 | <3 |
| I. | m-Xylylenediamine | <3.75 | <5 | <.5 |
| J. | None | 0 | <1 | 0 |

EXAMPLE 3

A lyophilized powder of bacteriorhodopsin is obtained according to D. Oesterhett Mtds. Enzy 31, 1974, 667. 0.1 gram of bacteriorhodopsin is mixed with 0.1 grams of 1,2 diaminocyclohexane cosolvent and 1.1 grams of water added. The bacteriorhodopsin is uniformly dispersed in the aqueous cosolvent as determined by small angle x-ray scattering.

EXAMPLE 4

An epoxy resin emulsion is prepared containing 55 parts Epon 828, 40 parts water, 4 parts polyvinyl alcohol and 1 part Triton X-100.

The epoxy resin emulsion is mixed with 18 parts of an aqueous epoxy resin curing solution containing 14% by weight Air Products 2460 polyamide and 9% by weight isophorone diamine. The resulting mixture is applied to copper strips. Upon curing, a hard, clear water resistant film is obtained.

It is understood that the invention is not limited to the specific descriptions above, which are intended to provide illustrative, working examples that encompass the inventive concept. Various modifications and changes which may be apparent to those skilled in the art to which the invention pertains may be made and also fall within the scope of the invention as defined by the following claims.

All patents and other publications cited herein are expressly incorporated by reference.

What is claimed is:

1. An aqueous solution comprising:

a hydrophobic amine;

a cosolvent amine of a formula:

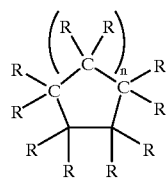

where n is 1, each R is independently selected from a group consisting of: hydrogen, a 1 to 6 carbon aliphatic, and a 0 to 6 carbon containing amine, wherein each R is chosen such that the cosolvent amine comprises at least two amine groups and wherein an amine group ratio of said hydrophobic amine to said cosolvent amine is from 0.5 to 5:1; and a quantity of water to maintain said solution as a homogeneous phase.

2. The solution of claim 1 wherein said cosolvent amine is a diaminocyclopentane.

3. A method for forming an aqueous solution of a hydrophobic amine comprising: mixing said hydrophobic amine with a cosolvent amine, wherein said cosolvent amine comprises a diaminocyclopentane, and a quantity of water to maintain said solution as a homogeneous phase.

\* \* \* \* \*

UNITED STATES PATENT AND TRADEMARK OFFICE
CERTIFICATE OF CORRECTION

PATENT NO. : 6,344,152 B2
DATED : February 5, 2002
INVENTOR(S) : Randy Edwin Cameron and Frank Rawolle It is certified that error appears in the above-identified patent and that said Letters Patent is hereby corrected as shown below:

Column 5,
Lines 2 - 10, replace the incorrect formula with the following correct formula:

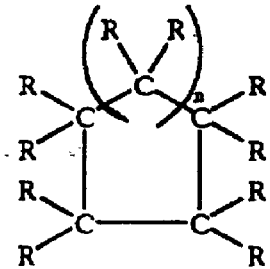

Signed and Sealed this

Seventh Day of January, 2003

JAMES E. ROGAN
*Director of the United States Patent and Trademark Office*